United States Patent
Hayashi (10) Patent No.: US 8,036,771 B2
(45) Date of Patent: Oct. 11, 2011

(54) TRANSPORTATION VEHICLE SYSTEM AND METHOD OF CONTROLLING TRANSPORTATION VEHICLE

(75) Inventor: Takao Hayashi, Inuyama (JP)

(73) Assignee: Murata Machinery, Ltd., Kyoto-shi, Kyoto (JP)

( * ) Notice: Subject to any disclaimer, the term of this patent is extended or adjusted under 35 U.S.C. 154(b) by 970 days.

(21) Appl. No.: 11/955,567

(22) Filed: Dec. 13, 2007

(65) Prior Publication Data

US 2008/0147306 A1 Jun. 19, 2008

(30) Foreign Application Priority Data

Dec. 15, 2006 (JP) ................................. 2006-338245

(51) Int. Cl.
*G06F 7/00* (2006.01)
(52) U.S. Cl. ............ 700/213; 700/229; 701/50; 712/225
(58) Field of Classification Search .................. 700/213, 700/229; 701/50; 712/225
See application file for complete search history.

(56) References Cited

U.S. PATENT DOCUMENTS 7,584,017 B2 * 9/2009 Sugano et al. ................ 700/228

FOREIGN PATENT DOCUMENTS

| JP | 58-167307 | A | | 10/1983 |
|---|---|---|---|---|
| JP | 4-22804 | A | | 1/1992 |
| JP | 5-94210 | A | | 4/1993 |
| JP | 6-239421 | A | | 8/1994 |
| JP | 10-87021 | A | | 4/1998 |
| JP | 2002-175117 | A | | 6/2002 |
| JP | 2002-258948 | A | | 9/2002 |
| JP | 2004-106945 | A | | 4/2004 |
| JP | 2005-306570 | | * | 11/2005 |
| JP | 2005-306570 | A | | 11/2005 |

OTHER PUBLICATIONS

Japanese Office Action dated Nov. 27, 2008, issued in corresponding Japanese Patent Application No. 2006-338245.

* cited by examiner

*Primary Examiner* — Thomas Black
*Assistant Examiner* — Luke Huynh
(74) *Attorney, Agent, or Firm* — Westerman, Hattori, Daniels & Adrian, LLP (57) ABSTRACT

A transportation vehicle measures its own absolute position, and transmits the measured absolute position to a ground controller. The ground controller keeps track of positions of a plurality of transportation vehicles in real time, and sends running instructions to travel, while avoiding interference between the transportation vehicles. As a result, the ground controller can control travel of the transportation vehicles in real time.

8 Claims, 8 Drawing Sheets

| From | To | ID | Interference | Priority level | Time | Natural order |

(A, B) → (C, D)            $4! \times 2^4 = 384$ (C, D) → (A, B)

TRANSPORTATION VEHICLE SYSTEM AND METHOD OF CONTROLLING TRANSPORTATION VEHICLE

TECHNICAL FIELD

The present invention relates to a system and a method of allowing a plurality transportation vehicle to travel under control by a ground controller.

BACKGROUND ART

In automated warehouses, stacker cranes are used as transportation vehicles. The stacker cranes travel back and forth along a route. If the stacker cranes travel along the same route, though transportation capability is enhanced, interference between the stacker cranes may occur undesirably. Patent Publication 1 (Japanese Laid-Open Patent Publication No. 2005-306570) discloses a technique of autonomously avoiding interference between the stacker cranes. In this regard, the inventor of the present application studied a system in which a ground controller manages positions of a plurality of stacker cranes in real time, and sends running instructions to the stacker cranes, based on the positions the stacker cranes, and achieved the present invention.

DISCLOSURE OF THE INVENTION

Problems to be Solved by the Invention

An object of the present invention is to provide a system in which a plurality of transportation vehicles travel under central control by a ground controller.

Another object of the present invention is to make it possible to accurately and rapidly measure absolute positions of respective transportation vehicles.

Still another object of the present invention is to ensure security in a situation in which a travel control system of a transportation vehicle is brought into an abnormal condition.

Still another object of the present invention is to improve transportation capability of a transportation vehicle system using stacker cranes.

Means for Solving the Problems

According to the present invention, in a transportation vehicle system for allowing a plurality of transportation vehicles to travel along a travel route, and execute transportation instructions, respectively, under control by a ground controller, each of the transportation instructions is an instruction designating a loading (pickup) position and an unloading (dropoff) position of an article, and a running instruction is an instruction designating a control object value regarding travel within a next predetermined time period, and the transportation vehicle executes a plurality of the running instructions for control of travel of the transportation vehicles, to execute the transportation instruction.

Each of the transportation vehicles includes measuring means for measuring its own position, communication means for transmitting the measured own position to the ground controller and receiving the running instruction from the ground controller, and travel control means for controlling a travel motor in accordance with the received running instruction.

The ground controller includes reception means for receiving positions of the respective transportation vehicles, running instruction generation means for generating the running instructions for the respective transportation vehicles based on the received positions of the transportation vehicles for avoiding interference between the transportation vehicles, and transmission means for transmitting the generated running instructions to the respective transportation vehicles, thereby allowing the ground controller to keep track of the positions of the respective transportation vehicles by the reception means, and controlling the positions of the transportation vehicles in accordance with the running instructions in real time.

According to another aspect of the present invention, in a method of controlling a plurality of transportation vehicles for allowing the transportation vehicles to travel along a travel route, and execute running instructions, respectively, under control of the ground controller, each of the transportation instructions is an instruction designating a loading position and an unloading position of an article, and a running instruction is an instruction designating a control object value regarding travel within a next predetermined time period, and the transportation vehicle executes a plurality of the running instructions for control of travel of the transportation vehicles, to execute the transportation instruction.

Each of the transportation vehicles carries out the steps of measuring its own position by measuring means, transmitting the measured own position to the ground controller, and receiving the running instruction from the ground controller by communication means, and controlling a travel motor in accordance with the received running instruction by travel control means.

The ground controller carries out the steps of receiving positions of the respective transportation vehicles by reception means, generating running instructions for the respective transportation vehicles by running instruction generation means based on the received positions of the transportation vehicles for avoiding interference between the transportation vehicles, and transmitting the generated running instructions to the respective transportation vehicles by transmission means, thereby allowing the ground controller to keep track of the positions of the respective transportation vehicles by the reception means, and controlling the positions of the transportation vehicles in accordance with the running instructions in real time.

In the specification, description regarding the transportation vehicle system is directly applicable to the method of controlling the transportation vehicle system.

In the context of "real time" herein, the transportation vehicle sends data of its own position or the like to the ground controller on a cycle of 5 msec or less, preferably, on a cycle of 1 msec or less, and particularly preferably, on a cycle of 0.5 msec or less, and the ground controller sends a running instruction based on the received position, on a cycle of 5 msec or less, preferably, on a cycle of 1 msec or less, and particularly preferably, on a cycle of 0.5 msec or less. Most preferably, the cycle of sending the running instruction from the ground controller to the transportation vehicle is the same as the cycle of the travel control by an on board controller of the transportation vehicle, because, in effect, the travel control of the transportation vehicle can be implemented by the ground controller. However, the running instruction may be sent on a cycle which is longer than the cycle of travel control by the on board controller, e.g., on a cycle which is an integral multiple of the cycle of the travel control by the on board controller, as along as the travel control can be implemented while avoiding interference between the transportation vehicles without any troubles. Further, in the embodiment, although a running instruction is transmitted from the ground controller each time the position is reported, or the position and the speed are reported from the transportation vehicle, the running instruction may be transmitted at the rate of once per three reports. Though the position of the transportation vehicle may be determined by monitoring rotation of the travel motor or the like using an encoder or the like, preferably, an absolute position relative to a predetermined origin is used as the position of the transportation vehicle.

Preferably, the transportation vehicle system further includes magnetic marks arranged discretely along the travel route in at least two rows.

As the measuring means of each of the transportation vehicles, at least two linear sensors corresponding to the magnetic marks in two rows for determining a relative position based on the magnetic marks, and means for converting the determined relative position to an absolute position of the transportation vehicle are provided.

Further, preferably, each of the transportation vehicles further includes means for stopping the travel motor in priority to control of the travel motor by the travel control means, when deviation from the running instruction is detected.

Preferably, the plurality of transportation vehicles are stacker cranes traveling back and forth along a common route.

Particularly preferably, the transportation vehicle system further includes a front end controller separately from the ground controller, and the front end controller includes memory means for storing a plurality of the transportation instructions, and order determination means for determining an order of executing the transportation instructions, for executing the transportation instructions in parallel by the plurality of transportation vehicles, while avoiding interference between the transportation vehicles. The front end controller successively outputs the transportation instructions to the ground controller, after determining the order of executing the transportation instructions.

ADVANTAGES OF THE INVENTION

In the present invention, the ground controller manages the positions of the transportation vehicles in real time. Thus, optimum running instructions are outputted in real time to avoid interference between the transportation vehicles. It is possible to obtain a system which makes it possible to control the transportation vehicles by the ground controller.

In order to control the transportation vehicles in real time, it is preferable to rapidly and accurately determine the absolute positions of the transportation vehicles. In this regard, if magnetic marks are arranged along the travel route in at least two rows, and the relative positions relative to the respective magnetic marks are converted into the absolute positions relative to origins, it is possible to rapidly and accurately determine the positions of the transportation vehicles, and it is also possible to rapidly and accurately determine the speeds of the transportation vehicles.

Though the ground controller can accurately keep track of the positions of the transportation vehicles, if an abnormal condition occurs in the travel control means of any of the transportation vehicles due to runaway phenomenon or the like, interference between the transportation vehicles may occur.

Assuming that the transportation vehicle travels in accordance with the running instruction, if no trouble occurs in the ground controller, or if no trouble occurs in communication between the ground controller and the transportation vehicle, such travel of the transportation vehicle in accordance with the running instruction would not be interrupted. Thus, by checking inter-vehicle distance between the transportation vehicles and the positions of the transportation vehicles, the presence of deviation from the running instruction can be detected. If it is determined that the position of the transportation vehicle or the like is deviated from the running instruction, by stopping the travel motor in priority to the control by the travel control means, an error occurs in the travel control means, and safety is ensured.

In the case where the present invention is applied to a system including a plurality of stacker cranes traveling back and forth on the same route, optimum transportation control can be implemented. For example, in comparison with the case where the travel route is divided, and the divided portions are allocated to the respective stacker cranes, it is possible to allocate the transportation instructions to a plurality of stacker cranes in a manner that the stacker cranes are concentrated in an area where transportation instructions are concentrated. Further, since the ground controller keeps track of the positions of the stacker cranes in real time, and sends the running instructions on a short cycle, it is possible to prevent interference between the transportation vehicles.

In the case where a plurality of stacker cranes travel back and forth on the same route, the problem of interference between the transportation vehicles is serious. In the present invention, since the ground controller keeps track of the positions of the stacker cranes in real time, depending on the positions of the stacker cranes, and depending on the presence of interference, it is possible to change the order of executing the transportation instructions, and allowing the transportation vehicles to execute the transportation instructions in accordance with the changed order.

The change, i.e., rearrangement of the order of executing the running instructions requires a large amount of computation. Further, the ground controller needs to communicate with the stacker cranes on a short cycle. Thus, a front end controller may be provided in addition to the ground controller, to determine the suitable order of executing the transportation instructions. In this case, the rearrangement of the order of the transportation instructions and the real time travel control for the stacker cranes can be implemented at the same time.

DESCRIPTION OF THE NUMERALS

2: host controller
3, 45: front end controller

4: ground controller
6: on board controller
8: travel system
10: elevation system
12: transfer system
14: linear sensor
16: height sensor
18: collision prevention sensor
19: monitor unit
21, 28: communication unit
22: buffer
23: interference evaluation unit
24: priority evaluation unit
25: time designation management unit
26: required time period evaluation unit
27: natural order evaluation unit
30: optimum allocation unit
31: efficiency evaluation unit
32: memory unit
34, 36: communication unit
37: vehicle state memory unit
38: running instruction generation unit
40: monitor unit
41, 47: buffer
48: record of transportation instruction
50: travel rail
51: stacker crane
54: rack
55 to 58: station
60, 61: magnetic mark
62, 63: counter
65: laser distance meter
66: reflection plate
71: vehicle state management process
72: running instruction generating process
74: monitor process
81: absolute position measuring process
82: inter-vehicle distance measuring process
83: travel control process
84: monitor process
90: ground controller process Embodiment FIGS. 1 to 10 show a transportation vehicle system according to an embodiment and its modification. In the drawings, a reference numeral 2 denotes a host controller. The host controller 2 receives transportation instructions from, e.g., a production controller (not shown) or a communication link, and sends the transportation instructions to a front end controller 3. Further, the host controller 2 sends the results to the production controller or the like which made the request. The front end controller 3 includes a personal computer or the like. The front end controller 3 rearranges the incoming transportation instructions, and determines the order of executing the transportation instructions (hereinafter also referred to as the "executing order") to achieve the maximal transportation efficiency such that the transportation instructions are executed by a plurality of transportation vehicles in parallel.

Figure 1:
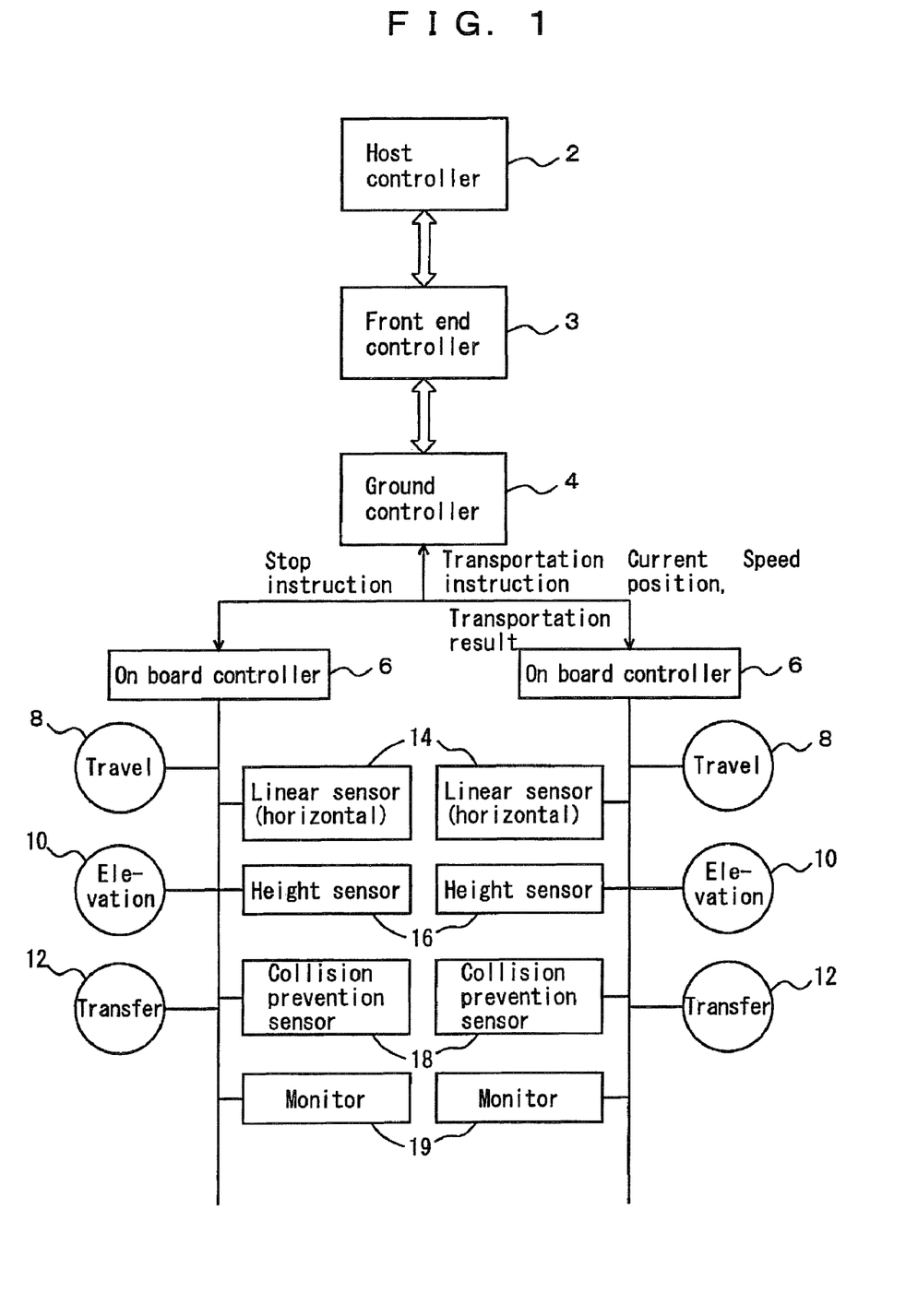
FIG. 1 is a block diagram showing a control system of a transportation vehicle system according to an embodiment.

A ground controller 4 is a controller which is physically different from the front end controller 3. Based on the executing order sent from the front end controller 3, the ground controller 4 allocates the transportation instructions to a plurality of transportation vehicles for allowing the transportation vehicles to execute the transportation instructions in parallel. Further, the ground controller 4 manages the current positions and speeds of the transportation vehicles in real time, and sends running instructions to the respective transportation vehicles in real time. For example, the transportation vehicle sends its own absolute position based on a predetermined origin, to the ground controller 4, on a cycle of 0.5 msec. Based on the received absolute position and its time-series analysis, the ground controller 4 determines the position and speed of the transportation vehicle, and evaluates, e.g., the presence (possibility) of interference with other transportation vehicles. Then, the ground controller 4 sends the running instruction to the transportation vehicle substantially without any delay, e.g., with a delay of 0.2 m second or less from reception. The running instruction is for operation of 0.5 msec or more in the next period and a communication delay period or the like, i.e., operation of about 1 msec in the next period.

An object position (destination) of the travel during the period is designated, or the speed is designated by maintaining the current speed, increasing or decreasing the current speed by n-steps, or stopping the transportation vehicle emergently. For example, a wireless LAN, power line communication using feeder lines, optical communication, or feeder radio is used for communication between the ground controller 4 and the on board controller 6.

A reference numeral 6 denotes the on board controller. The on board controller 6 is provided in a stacker crane as the transportation vehicle. The on board controller 6 includes communication means for communication with the ground controller 4. In the embodiment, the number of the stacker cranes is two. Alternatively, three or more stacker cranes may be used. The stacker crane has a travel system 8, an elevation system 10, and a transfer system 12, and each of the travel system 8, the elevation system 10, and the transfer system 12 has a motor and a control unit. The travel system 8 has a servo travel control unit for controlling a travel motor in accordance with a running instruction received from the ground controller 4. Further, the stacker crane has a linear sensor 14 for determining an absolute distance from a predetermined traveling origin, and temporally differentiating the absolute distance to calculate the current speed. A height sensor 16 determines a height position of an elevation frame, and is used for stopping the elevation frame at a predetermined shelf of a rack. A collision prevention sensor 18 prevents interference between the stacker cranes, in particular, prevents collision by measuring an inter-vehicle distance between the transportation vehicles, temporally differentiating the inter-vehicle distance, and determining a relative speed based on the result of temporal differentiation.

Operation of a monitor unit 19 is triggered, e.g., by a situation where the inter-vehicle distance between the stacker cranes is reduced within a predetermined distance, and the monitor unit 19 monitors whether the current position of the stacker crane or the speed of the stacker crane matches the running instruction from the ground controller 4. As long as the travel system 8 is controlled in accordance with the running instruction, there is no deviation (mismatch) from the running instruction. If there is any deviation, it is likely that an abnormal condition occurs in travel control means in the travel system 8. Under the circumferences, the travel motor is stopped in priority to the control by the travel control means. Further, the monitor unit 19 monitors whether the difference between the absolute position of the stacker crane and the position designated by the running instruction is within an allowable range or more, or whether the difference between the speed designated by the running instruction and the actual speed is within an allowable range or more. If the monitor unit 19 detects that the difference is not within the allowable range, the travel motor is stopped in priority to the control of the travel control means.

Figure 2:
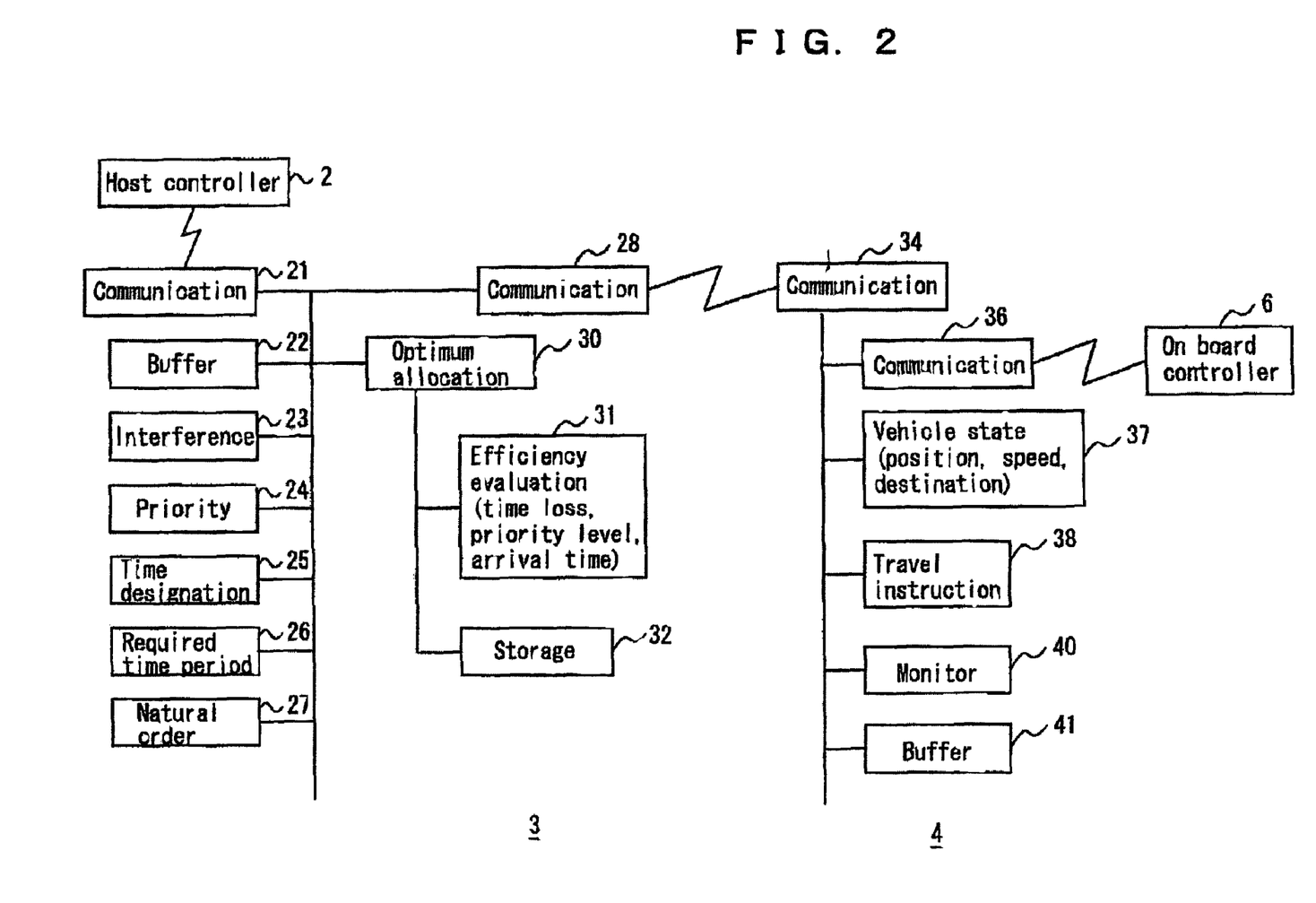
FIG. 2 is a block diagram showing a front end controller and a ground controller according to the embodiment.

FIG. 2 shows structure of the front end controller 3 and the ground controller 4. A communication unit 21 of the front end controller 3 communicates with the host controller 2, and a communication unit 28 of the front end controller 3 communicates with the ground controller 4. A buffer 22 stores transportation instructions, and forms a queue. An interference evaluation unit 23 evaluates interference between transportation instructions, and associates sets of transportation instructions that cannot be executed at the same time due to interference, or associates sets of transportation instructions that can be executed at the same time in the absence of interference. Either of these manners can be adopted. Further, in addition to evaluate whether any interference is present or not, it is possible to evaluate the degree of interference in multiple levels, e.g., in interference levels 0 to 15. A priority evaluation unit 24 stores priority levels of the respective transportation instructions. For example, when the priority evaluation unit 24 receives a transportation instruction, if the transportation instruction designates priority transportation, the priority level is high from the beginning. Then, in the buffer 22, the priority level increases gradually over the time to wait for execution. Some of the transportation instructions cause interference easily, and some of the transportation instructions do not cause interference easily. For example, it is not likely that a transportation instruction for a short travel distance causes interference with other transportation instructions. In contrast, a transportation instruction for a long travel distance, in an area around the center of the travel rail causes interference with other transportation instructions easily. Since the transportation instruction which causes interference easily tends to be backlogged, the transportation instruction of this type should be designated to have a high priority level beforehand.

In the case where the time of loading (pickup) and the time of unloading (dropoff) are designated by the transportation instruction, a time designation management unit 25 stores these time designations. A required time period evaluation unit 26 calculates an actual required time period required for executing the respective transportation instructions. For example, the time period is an estimated period of time from the time of starting transfer of an article at a loading (pickup) position to the time of finishing unloading the article at an unloading (dropoff) position, and the period of time can be estimated based on the travel distance or the elevation distance of the elevation frame. A natural order evaluation unit 27 picks up transportation instructions which should be ordered naturally, e.g., in the case where an unloading destination in the previous transportation instruction is close to a loading position in the next transportation instruction, and determines the order of the picked up transportation instructions beforehand.

An optimum allocation unit 30 determines stacker cranes used for executing the transportation instructions in the buffer 22, and determines the optimum order of executing the transportation instructions. For this purpose, the optimum allocation unit 30 receives data regarding states of the stacker cranes such as the current positions of the stacker cranes from the ground controller 4. In addition to the states of the stacker cranes, factors such as interference between the transportation instructions, the priority level, the time designation, the required time period, and the natural order are taken into consideration. Further, the optimum allocation unit 30 may divide one transportation instruction into a plurality of transportation instructions in order to avoid interference or execute the transportation instructions in accordance with the time designations or the priority levels in the transportation instruction. For example, one transportation instruction is divided into two transportation instructions for loading an article at a designated time for loading, and temporarily storing the article in a suitable shelf before a designated time for unloading.

Assuming that, e.g., ten transportation instructions are stored in the buffer, in the case of using two stacker cranes, for example, in order to meet the immediate needs, the order of executing three instructions for each of the two stacker cranes, i.e., six transportation instructions in total may be determined in advance. Alternatively, the order of executing all of the ten transportation instructions may be determined. A reference numeral 31 denotes an efficiency evaluation unit for evaluating the efficiency of the transportation instruction. The efficiency may be evaluated, e.g., based on time losses, the empty travel time period, and the empty travel distance. For example, in the total required time period, a period of time in which the transportation vehicle is stopped, or moving without transporting any article, a period of time in which the transportation vehicle is stopped for avoiding interference are periods of time losses. The efficiency is determined based on the ratio of the periods of the loss times to the total required time period. Likewise, the ratio of the empty travel distance in which the transportation vehicle does not transport any article to the entire travel distance is taken into consideration for evaluating the efficiency.

The presence of interference may be taken into consideration as wait time for avoiding interference or as a time loss, in evaluating the efficiency. Alternatively, the presence of interference may be evaluated as another factor that is not a time loss. For example, the order of executing the transportation instructions may be disregarded if there is any interference. The priority levels are positively considered for evaluating the efficiency. If a transportation instruction having a high priority level is executed, the efficiency is evaluated as high. Thus, the efficiency is evaluated based on, e.g., the empty travel distance, the empty travel time period, the wait time, the time losses, the presence of interference, the priority levels, and the number of executed transportation instructions.

In evaluating the efficiency, though it may be possible to determine the transportation instruction having the maximum efficiency, for example, if the number of transportation instructions stored in the buffer 22 becomes about 100, it is difficult to determine the transportation order having the maximum efficiency. In this case, the transportation order is determined, aiming to achieve the maximal transportation efficiency. When it is no longer possible to achieve further improvement in the efficiency by partially changing the order of executing the transportation instructions, it can be said that the maximal efficiency is achieved. When the order of executing the transportation instructions with the maximal efficiency, and the stacker cranes allocated to the respective transportation instructions are determined, the data is stored in the memory 32. The optimum allocation unit 30 outputs the next several transportation instructions, the order of executing the transportation instructions, and the numbers of stacker cranes allocated to the transportation instructions, to the ground controller 4 through the communication unit 28.

The communication unit 34 of the ground controller 4 communicates with the front end controller 3, and communicate with the respective on board controllers 6 using the communication unit 36, by means of, e.g., a wireless LAN, power line communication, optical communication, or feeder radio. A vehicle state memory unit 37 stores the current positions reported from the respective on board controllers 6, and the current seed based on historical data of the current positions. Further, the vehicle state memory unit 37 stores destinations allocated by the optimum allocation unit 30, or destinations reported from the on board controllers 6. A running instruction generation unit 38 generates a running instruction for about 0.5 msec to 1 msec in the next period, as data of the object position or the object speed, with reference to the data from the vehicle state memory unit 37 to prevent interference between the transportation vehicles. A monitor unit 40 monitors whether each of the positions and the speeds reported from the on board controllers 6 is deviated from a value designated by the transportation instruction, by a predetermined value or more. In the presence of deviation, for example, the corresponding stacker crane is stopped through the running instruction generation unit 38. The monitor unit 40 may not be provided, and only the monitor unit 19 of the on board controller 6 may be provided.

Figure 3:
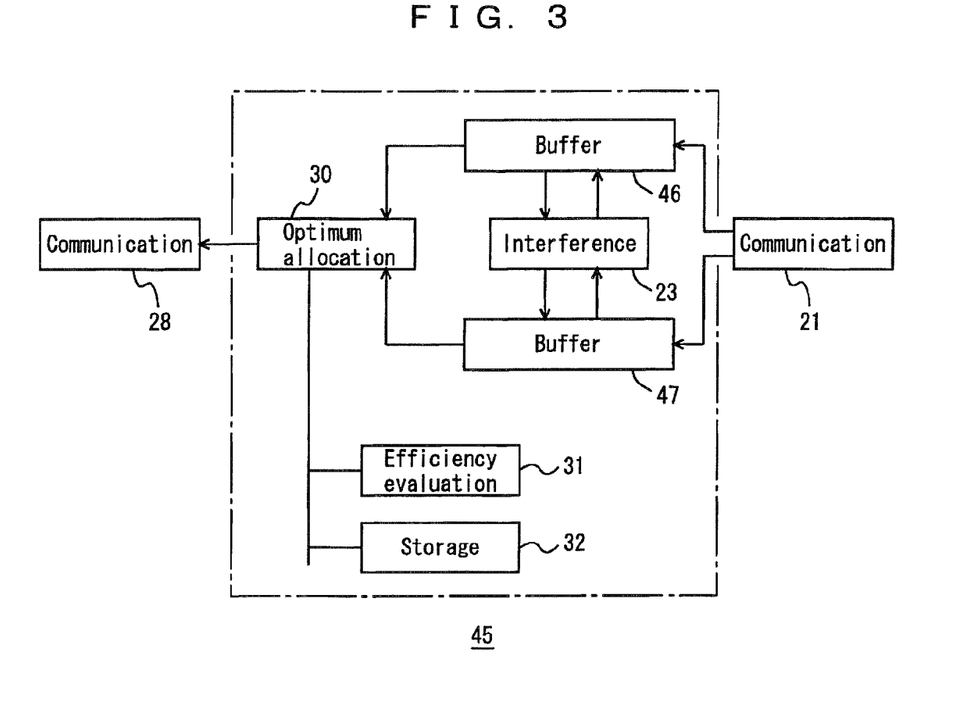
FIG. 3 is a block diagram showing the front end controller according to the embodiment.

In the example of FIG. 2, the transportation instructions are stored in the buffer 22 without determining stacker cranes for executing the transportation instructions. Alternatively, it is possible to determine stacker cranes for executing the inputted transportation instructions based on the starting points and the destinations, i.e., travel routes. A front end controller 45 for this purpose is shown in FIG. 3. The transportation instructions are separately stored in buffers 46, 47 based on the starting point and the destination for each of the stacker cranes, and the presence of interference is evaluated by the interference evaluation unit 23. As in the case of FIG. 1, the priority levels, the required time periods, and the natural order is added to the data of the respective transportation instructions. Further, as in the case of FIG. 2, the optimum allocation unit 30 determines the transportation efficiency and the order of executing the transportation instructions having the maximal efficiency, and allocates the data to the stacker cranes. Other features are the same as those in the case of the front controller 3 shown in FIG. 2.

Figure 4:
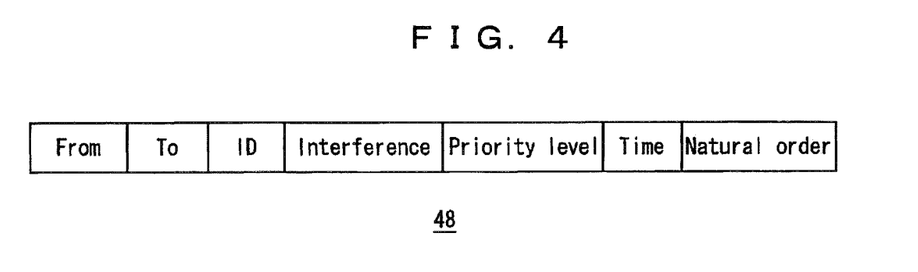
FIG. 4 is a diagram showing a manner of storing a transportation instruction according to the embodiment.

FIG. 4 shows a record 48 of a transportation instruction in the buffer 22 or the like. A loading position is written in a "From" field, an unloading position is written in a "To" fields, and an ID of the transportation instruction or the like is written in an "ID" field. Further, IDs of other instructions having interference with the transportation instruction are written in an "interference" field. A priority level of the transportation instruction is written in a "priority level" field. An actual required time period is written in a "time" field. A "natural order" field includes the order of executing transportation instructions that is determined naturally, e.g., in the case where the unloading position in the previous transportation instruction and the loading position are close to each other, or in the case where the unloading position and the loading position in the following transportation instruction are close to each other. For example, the order is written in the form of IDs of the transportation instructions.

Figure 5:
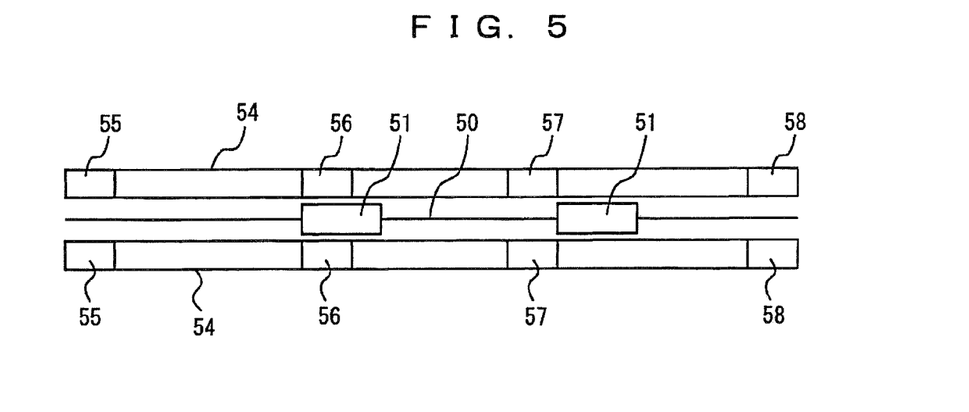
FIG. 5 is a view schematically showing a layout of travel rails and stacker cranes according to the embodiment.

FIG. 5 shows a physical layout of a transportation vehicle system. A plurality of stacker cranes 51 travel back and forth on a straight travel rail 50. Reference numerals 54 denote racks. Reference numerals 55 to 58 denote stations. The station stations 55 are only used by stacker cranes on the left side, and the stations 58 are only used by stacker cranes on the right side. The stations 56, 57 are used by both of the stacker cranes on the left side and the stacker cranes on the right side. Restrictions are applied in the travel of the stacker crane 51. The inter-vehicle distance between the stacker crane 51 and the other stacker crane 51 should not become a predetermined distance or less, e.g., the length corresponding to one shelf of the rack or less. Since each stacker crane 51 can travel over substantially the entire area of the travel rail 50, for example, if transportation instructions are concentrated in the area on the right side in FIG. 5, one stacker crane is dedicatedly used for operation in this area, and the other stacker cranes are used for handling transportation instructions in the areas at the center, and on the left side in FIG. 5 to achieve efficient transportation.

Figure 6:
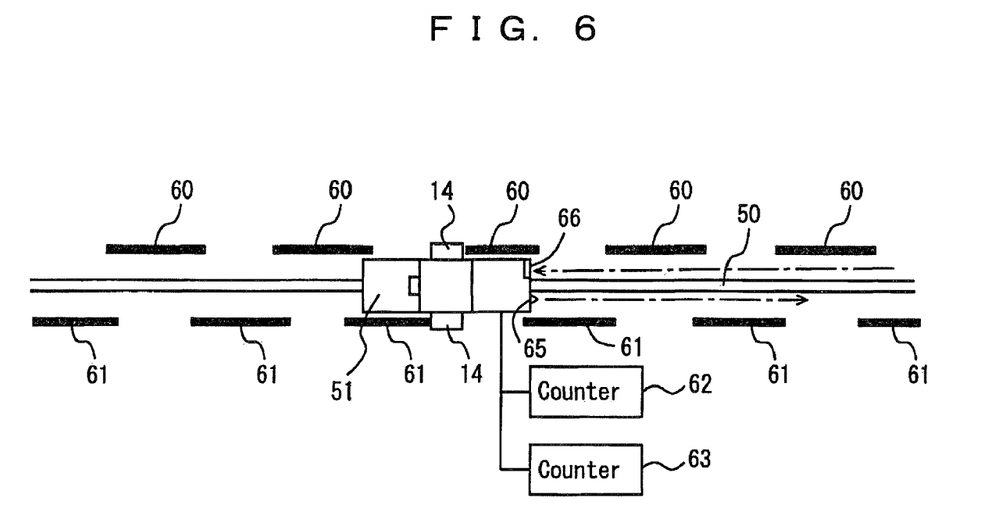
FIG. 6 is a view showing detection of absolute positions by linear sensors according to the embodiment.

FIG. 6 shows a manner of reading an absolute position by linear sensors 14. For example, magnetic marks 60, 61 are provided on both of left and right sides, or on one side in upper and lower two stages of the travel rail 50. For example, the magnetic marks 60, 61 are magnetic bodies or magnets. The left magnetic mark and the right magnetic mark are partially overlapped with each other for allowing the linear sensors 14 to detect any of the magnetic marks 60, 61 at an arbitrary position. For example, the stacker crane 51 has two, left and right linear sensors 14. In the area of each magnetic mark 60, 61, the linear sensor 14 detects a position in the magnetic mark, i.e., a relative position of each magnetic mark from a reference point. The stacker crane 51 stores absolute positions of the reference points of the respective magnetic marks. By adding, or subtracting the relative position of the reference point, to or from the absolute position of the reference point, the absolute position of the stacker crane is determined, and the data is stored in a counter 62 or the like. Instead of storing the absolute positions of the reference positions of the respective magnetic marks, the lengths of the magnetic marks and overlapping between the magnetic marks may be stored. Further, a counter 63 is used for determining the position of the magnetic mark by the number of magnetic marks from the travel origin. Using these items of data and the linear sensors 14, the absolute position based on, e.g., the travel origin is determined, and by temporal differentiation or temporal subtraction, the current speed is calculated.

When the accurate current position and the current speed of the stacker crane 51 are obtained, by accurately determining the possibility of interference such as collision, it is possible to use the data for collision avoidance. Rearrangement of the order of executing the transportation instructions is performed on the premise that the transportation instructions can be executed by the respective stacker cranes 51 in accordance with the estimated schedule. For example, in the case where troubles such as a travel delay due to incomplete control of the travel speed, and re-running of the stacker crane 51 for retry due to incomplete control of the stop position occur repeatedly, interference between the stacker cranes 51 may occur. Thus, the linear sensor 14 accurately determines the current absolute position and the current speed of the stacker crane 51 to execute the transportation instruction as scheduled. A reference numeral 65 denotes a laser distance meter, and a reference numeral 66 denotes a refection plate. The laser distance meter 65 and the reflection plate 66 form a collision prevention sensor 18 for preventing collision, and using the reflection plate 66 of another stacker crane, the laser distance meter 65 measures an inter-vehicle distance between the stacker cranes. Based on the data obtained by temporally differentiating the inter-vehicle distance, the relative speed of the stacker crane is determined.

Figure 7:
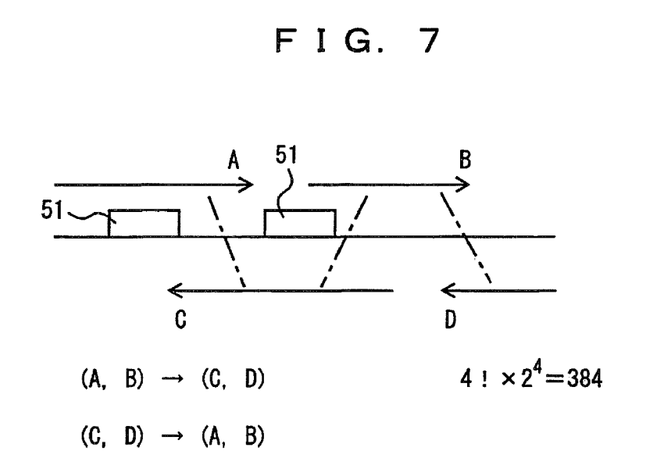
FIG. 7 is a view showing rearrangement of transportation instructions according to the embodiment.

FIG. 7 schematically shows allocation of the transportation instructions to the stacker cranes 51. It is assumed that there are four transportation instructions A to D. Interference between the transportation instructions is denoted by dashed dotted lines. In this case of allocating the four transportation instructions to the two stacker cranes arbitrarily, there are 24 ways (4!) of possible allocation orders including nonsense allocation orders. Since one of two transportation vehicles is allocated to each of the transportation instructions, the number of combinations is about 400 in total. When interference is taken into account, combinations of the transportation instructions which can be executed at the same time is limited to three, (1) A and B, (2) A and C, and (3) C and D. If the transportation instructions A and D are executed at the same time, it is necessary to execute the transportation instructions B and C at the same time. This combination is inconsistent. Therefore, the actual possibility is limited to a combination in which the transportation instructions A and B are executed firstly, and then, the transportation instructions C and D are executed, and a combination in which the transportation instructions C and D are executed firstly, and then, the transportation instructions A and B are executed. By evaluating the possibility of interference beforehand, it is possible to significantly reduce the possible orders of executing the transportation instructions. Even if the number of the transportation instructions is much larger, by taking the natural order between the transportation instructions into account, the combinations which need to be considered is reduced, and simulation of the small number of combinations becomes possible.

Figure 8:
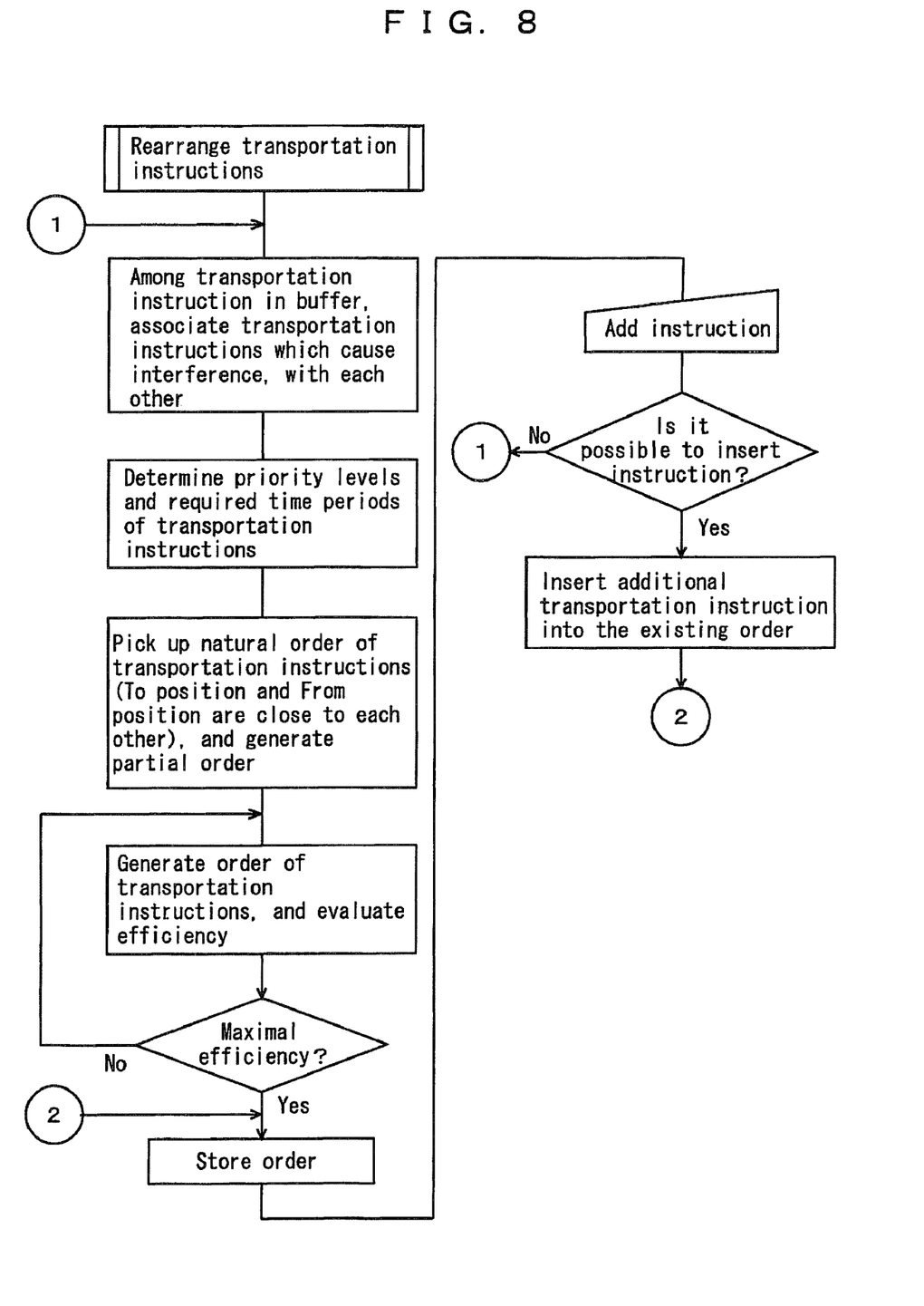
FIG. 8 is a flow chart showing an algorithm of rearranging the transportation instructions.

FIG. 8 shows an algorithm of rearranging the order of transportation instructions to obtain the optimum execution order. Among the transportation instructions stored in the buffer, the transportation instructions that interfere with each other, or the transportation instructions that do not interfere with each other, are associated with each other. Then, auxiliary information such as the priority levels of the transportation instructions and the required time periods are obtained. In the case where the object position of the first transportation instruction is close to the start position of the next transportation instruction, it is natural that these transportation are executed successively. Therefore, the respective natural orders of executing the transportation instructions are picked up, and determined as partial orders. Among the transportation instructions, those having the high priority levels are executed ahead of the other transportations, and now, it becomes ready to search a combination in which the natural orders of executing the transportation instructions are maintained.

Next, provisional orders of executing the transportation instructions are determined. Efficiency evaluation is performed for each of the plurality of provisional orders. In efficiency evaluation, for example, simulation is carried out to estimate the position, the state, and the speed of the stacker crane at short intervals of time. While checking the presence of interference, the executing conditions of the transportation instructions are simulated. Based on the obtained transportation results, the efficiency is evaluated. For example, the efficiency is evaluated by the rate of the empty travel distance to the entire travel distance, the rate of time losses to the entire required time period, the sum of priority levels of the executed transportation instructions. When the maximal efficiency is carried out, no further search for the executing order is stopped, the order having the maximal efficiency is stored, and the transportation instructions are allocated to the stacker cranes successively.

The transportation instructions are added by the host controller at all times. When a transportation instruction is added, it is checked where the added transportation instruction can be inserted into any position in the stored order of the transportation instructions. In this case, on condition that the efficiency is not lowered below the current value, efficiency is evaluated for each of a plurality of possible insertion positions, and if there is any desired insertion position, the new transportation instruction is added to the existing order of transportation instructions. If it is not possible to handle the new transportation instruction simply by partially revising the existing transportation instructions, i.e., if there is no position for inserting the new transportation instruction, the process returns to the start from a connector 1, and the order of transportation instructions is searched again. Further, if the executing conditions of the transportation instructions become significantly different from the simulated executing conditions, the routine returns to the connector 1, and the executing order is optimized again.

Figure 9:
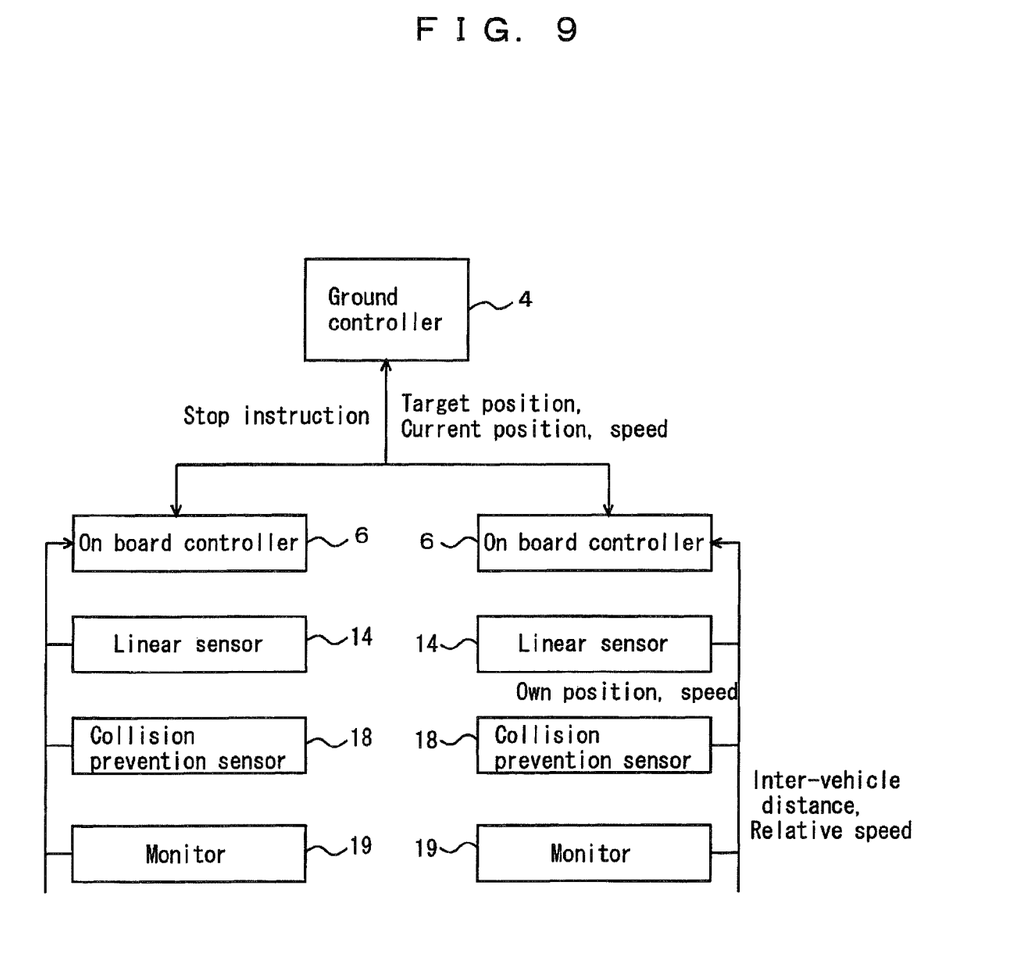
FIG. 9 is a block diagram showing an interference avoidance mechanism according to the embodiment.

FIG. 9 shows a system for preventing interference between the stacker cranes. Each of the on board controllers 6 has information of the object positions, the current positions, and the current speeds of the other stacker cranes, by receiving information through communication with the ground controller 4. The on board controller 6 can evaluate the presence of interference based on the object position, the current position, and the current speed of its stacker crane. For this purpose, data from the linear sensor 14 is used. Since the data from the linear sensor 14 has reliability, it is possible to reliably prevent interference. Further, the collision prevention sensor of the stacker crane determines the inter-vehicle distance and the relative speed. Based on these items of data, it is possible to evaluate possibility of interference. When the on board controller 6 detects possibility of interference with the other stacker cranes, processes such as deceleration, stop, and backward movement are performed. Further, the ground controller 4 evaluates possibility of interference based on the object positions, the current positions, and the current speeds of the stacker cranes. In the case where possibility of interference is high, the ground controller 4 outputs an instruction for avoiding interference such as a stop instruction. Further, an uninterruptible power supply or an electrical double layer is used as a backup power supply for the ground controller 4 and the on board controller 6 for making it possible to carry out at least the process necessary for avoiding collision even if a power failure occurs.

The monitor unit 19 monitors whether the current position or the current speed of the stacker crane is deviated from the running instruction. If every stacker crane travels in accordance with the running instruction, the inter-vehicle distance does not become the predetermined distance or less, and the current position and the current speed are never deviated from the running instruction. The state where the difference between the current position or the current speed and the value designated by the running instruction becomes a predetermined value or more is referred to as "deviation". Deviation from the running instruction indicates an abnormal condition such as runaway in the travel control unit. When the travel control unit cannot eliminate deviation from the running instruction autonomously, such a state is detected by the monitor unit 19, and the stacker crane is stopped, for example.

Figure 10:
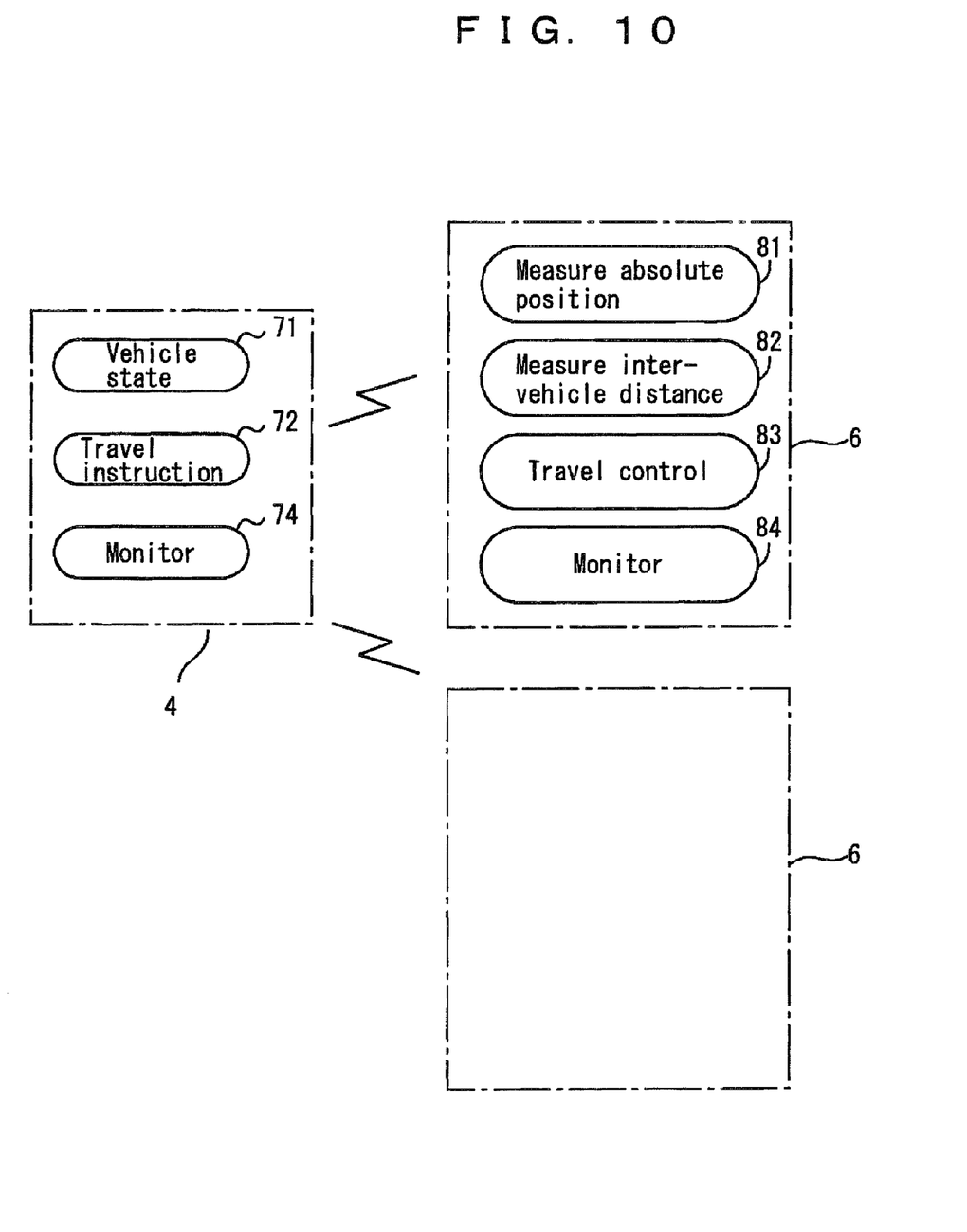
FIG. 10 is a diagram showing a relationship between processes of the ground controller and processes of an on board controller.

FIG. 10 shows communication between the ground controller 4 and the on machine controller 6 as interprocess communication. An absolute position measuring process 81 of the on machine controller 6 sends the absolute position, e.g., on a cycle of 0.5 msec. A vehicle state management process 71 updates the current position, the current speed, the destination or the like in real time based on the data received from the on board controller 6. The current state of the stacker crane is indicated by the position and the speed. Based on the destination, the object of the future state of the stacker crane can be indicated. The cycle of the update is, e.g., every 0.5 msec, and at most, every 5 msec.

The running instruction generation process 72 generates a running instruction in accordance with the current absolute position, the current speed, or the like of the stacker crane for avoiding interference. Data such as the absolute positions and the speeds of other stacker cranes may be added to the running instruction. Alternatively, the on board controller may intercept communication between the on board controllers of the other stacker cranes and the ground controller for obtaining these items of data. Since the running instruction generation process 72 knows the positions and the speeds of the stacker cranes, the running instruction generator process 72 can determine what running instructions causes interference, and what running instructions are free from interference. Further, in evaluating the presence of interference, the destinations of the stacker cranes can be utilized as auxiliary data. For example, the running instruction indicates the next object position or the next object speed, in other words, the state space of the stacker crane made up of the position and the speed, and the next object state of the stacker crane. For example, the cycle of the running instruction is every 0.5 msec, and every 5 msec at most, and the delay from reception of the position to transmission of the running instruction is e.g., 0.2 msec or less.

If the stacker crane travels in accordance with running instruction, problems such as interference do not occur. However, the stacker crane may be deviated from the running instruction due to a trouble in the travel control unit of the on board controller 6. Monitor processes 74, 84 monitor the abnormal condition of the stacker crane, specifically, monitor deviation from the running instruction. The monitor process 74 of the ground controller 4 may not be provided. Alternatively, only the monitor process 84 of the on board controller 6 may be provided. Monitoring may be performed when there is a sign of deviation from the running instruction, e.g., in the case where the inter-vehicle distance is reduced. Alternatively, monitoring may be performed all the time to check whether the absolute position data matches the position based on the running instruction.

An absolute position measuring process 81 of the on board controller 6 determines the current position using a linear sensor on the cycle of e.g., 5 msec, and sends the data of the current position to the vehicle state management process 71. An inter-vehicle distance measuring process 83 measures the inter-vehicle distance, and passes the control to the travel control process 83 or the monitor process 84 to avoid interference. Transmission of the absolute position, transmission of the running instruction or the like is carried out, e.g., on the cycle of 0.5 msec, and the delay period from reception of the absolute position to transmission of the running instruction is, e.g., 0.2 msec or less.

Figure 11:
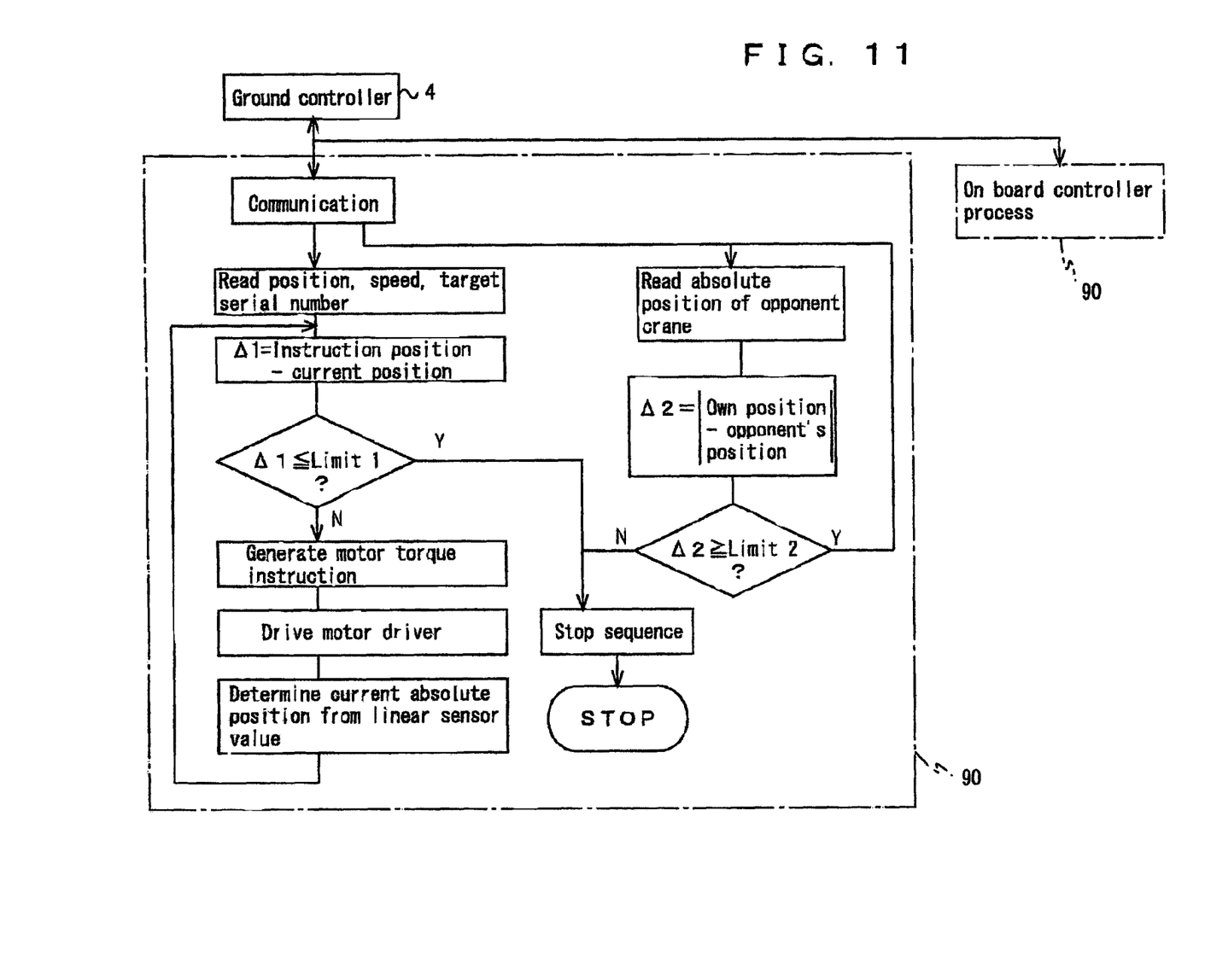
FIG. 11 is a flowchart of control implemented by the on board controller according to the embodiment.

FIG. 11 shows an operation algorithm of the on board controller 6. An on board controller process 90 reads the current position, the current speed, and the object shelf address (serial number) at the destination from a memory, and determines the difference Δ1 between the instructed position and the current position. If the difference Δ1 is a limit value Limit 1 or less, a stop sequence is carried out to stop operation. If the difference Δ1 is greater than the limit value L1, in correspondence with the difference between the speed instruction from the ground controller 5 and the current speed, the motor torque is determined, and the motor driver is driven for traveling. Based on the linear sensor value, the current absolute position is determined, and the information is reported to the ground controller 4. The cycle of carrying out the above process is, e.g., 0.5 msec.

In order to prevent interference with another stacker crane, the current position (determined by the linear sensor) of the approaching (opponent) stacker crane is read from the memory. As a difference Δ2, the difference between the current position of the own stacker crane and the current position of the opponent stacker crane is determined. Likewise, the distance between the own stacker crane and the opponent stacker crane is determined. If any of these values is a second limit value Limit 2 or less, the stop sequence is carried out. In this manner, using the inter-vehicle distance based on the linear sensor and the inter-vehicle distance based on the collision prevention sensor, dual safety is achieved.

In the embodiment, a plurality of stacker cranes are controlled by the ground controller. Alternatively, about 100 overhead traveling vehicles traveling along the travel route in a circulating manner may be controlled by the ground controller. The stacker crane executes the running instruction. The transportation instruction itself may be transmitted to, or may not be transmitted to the stacker crane.

In the embodiment, the following advantages are obtained.

(1) It is possible to manage the positions of a plurality of stacker cranes in real time, and transmit running instructions to the stacker cranes for control.

(2) Thus, it is possible to operate the plurality of stacker cranes efficiently, and it is possible to prevent interference between the stacker cranes.

(3) Since the absolute positions over the entire operating area of the stacker cranes and the speeds of the stacker cranes are determined by linear sensors, it is possible to implement the control based on the correct current positions and speeds.

(4) If any abnormal condition occurs in the travel control system of the stacker cranes, such an abnormal condition can be detected by the monitor units 19, 40 or the like.

(5) It is possible to achieve the maximal transportation efficiency of the stacker cranes while avoiding interference between the stacker cranes.

(6) Rearrangement of the transportation order is carried out by the ground controller 4. Since the ground controller 4 manages a plurality of transportation instructions, it is possible to simulate, or evaluate the transportation conditions, while evaluating the positions of the respective transportation vehicles.

(7) Even in the case where there are a lot of transportation instructions, by not executing transportation instructions that may cause interference, and maintaining the natural order of the transportation instructions in evaluation, the number of combinations to be searched becomes small. Therefore, it is possible to determine the optimum allocation in real time.

(8) By giving high priority levels to transportation instructions that tend to be backlogged, due to the long travel distance or interference with other transportation instructions, it is possible to prevent the delay of these running instructions.

(9) In the case of adding a transportation instruction, since it is sufficient to partially revise the order of executing the existing transportation instructions, it is possible to shorten the time required for calculation.

The invention claimed is:

1. A transportation vehicle system, comprising:
   a ground controller; and
   transportation vehicles which travel along a travel route, and execute transportation instructions under control of said ground controller,
   wherein the transportation vehicles each comprising:
      measuring means for measuring at least one of its own position and speed;
      communication means for transmitting at least one of the measured own position and speed to the ground controller, and for receiving a running instruction from the ground controller, the transmitting from the transportation vehicles to the ground controller occurring periodically on a communication cycle; and travel control means for controlling a travel motor in accordance with the received running instruction;

wherein the ground controller comprises:

reception means for receiving positions of the respective transportation vehicles;

running instruction generation means for generating the running instructions for the respective transportation vehicles based on at least one of the received positions and speeds of the transportation vehicles for avoiding interference between the transportation vehicles; and transmission means for transmitting the generated running instructions to the respective transportation vehicles, thereby allowing the ground controller to keep track of at least one of the positions and speeds of the respective transportation vehicles by the reception means, and for controlling at least one of the positions and speeds of the transportation vehicles in accordance with the running instructions in real time, the transmitting from the ground controller to the transportation vehicles occurring in the same communication cycle as the transmitting from the transportation vehicles to the ground controller, wherein the transportation instructions designate a loading position and an unloading position of an article, wherein the running instruction designates at least one of the positions and speeds of the transportation vehicles over a travel control cycle, and wherein the transportation vehicles executes a plurality of the running instructions for control of travel of the transportation vehicles, thereby executing the transportation instructions.

2. The transportation vehicle system according to claim 1, further comprising magnetic marks arranged discretely along the travel route in at least two rows, wherein said measuring means comprises at least two linear sensors corresponding to the magnetic marks for determining a relative position and speed based on the magnetic marks, and means for converting the determined relative position to an absolute position of the transportation vehicle.

3. The transportation vehicle system according to claim 1, wherein the transportation vehicles each further comprise means for stopping the travel motor in priority to control of the travel motor by the travel control means, when deviation from the running instruction is detected.

4. The transportation vehicle system according to claim 1, wherein the transportation vehicles are stacker cranes traveling back and forth along a common route.

5. The transportation vehicle system according to claim 4, further comprising a front end controller separate from the ground controller, the front end controller comprising:

memory means for storing a plurality of the transportation instructions; and order determination means for determining an order of executing the transportation instructions and for executing the transportation instructions in parallel by the plurality of transportation vehicles, while avoiding interference between the transportation vehicles, wherein the front end controller successively outputs the transportation instructions to the ground controller, after determining the order of executing the transportation instructions.

6. A method of controlling transportation vehicles to travel along a travel route, and execute transportation instructions under control of a ground controller, comprising:

self-measuring at least one of positions and speeds of the transportation vehicles, performed by measuring means disposed on each of the transportation vehicles;

transmitting at least one of the measured positions and speeds of the transportation vehicle from the transportation vehicle to the ground controller, the transmitting from the transportation vehicles to the ground controller occurring periodically on a communication cycle;

receiving positions of the transportation vehicles, performed by reception means of the ground controller;

generating running instructions for the transportation vehicles, performed by running instruction generation means of the ground controller, based on at least one of the received positions and speeds of the transportation vehicles for avoiding interference between the transportation vehicles;

transmitting the generated running instructions to the transportation vehicles, performed by transmission means, thereby allowing the ground controller to keep track of at least one of the positions and speeds of the respective transportation vehicles by the reception means and control at least one of the positions and speeds of the transportation vehicles in accordance with the running instructions in real time, the transmitting from the ground controller to the transportation vehicles occurring in the same communication cycle as the transmitting from the transportation vehicles to the ground controller;

receiving the running instruction from the ground controller, performed by the communication means of the transportation vehicles; and controlling a travel motor of the transportation vehicles in accordance with the received running instruction by travel control means, wherein the transportation instructions designate a loading position and an unloading position of an article, and wherein the running instruction designates the positions and speeds of the transportation vehicles over a travel control cycle, and the transportation vehicle executes a plurality of the running instructions for control of travel of the transportation vehicles, to execute the transportation instruction.

7. The transportation vehicle system according to claim 1, wherein the communication cycle is the same as the travel control cycle.

8. The method according to claim 6, wherein the communication cycle is the same as the travel control cycle.

* * * * *